(12) United States Patent
Dembny

(10) Patent No.: US 9,072,308 B1
(45) Date of Patent: Jul. 7, 2015

(54) UTENSIL FOR LAYERING LIQUIDS

(76) Inventor: Daniel Raymond Dembny, Las Vegas, NV (US)

( * ) Notice: Subject to any disclaimer, the term of this patent is extended or adjusted under 35 U.S.C. 154(b) by 377 days.

(21) Appl. No.: 13/536,084

(22) Filed: Jun. 28, 2012

Related U.S. Application Data

(60) Provisional application No. 61/508,220, filed on Jul. 15, 2011.

(51) Int. Cl.
| | | |
|---|---|---|
| *A23L 1/10* | (2006.01) | |
| *B67D 1/10* | (2006.01) | |
| *A23G 9/04* | (2006.01) | |
| *B67D 1/00* | (2006.01) | |

(52) U.S. Cl.
CPC .............. *A23G 9/045* (2013.01); *B67D 1/0053* (2013.01)

(58) Field of Classification Search
CPC ...... A23G 9/045; B67D 1/0053; A47J 31/401
USPC .......... 99/275–323.11; 426/77–231; 141/351, 141/366; 30/141
See application file for complete search history.

(56) References Cited

U.S. PATENT DOCUMENTS

| | | | | |
|---|---|---|---|---|
| 7,997,305 | B2 * | 8/2011 | Haramis et al. | ................ 141/100 |
| 8,467,670 | B2 * | 6/2013 | Baston | ........................... 392/444 |

* cited by examiner

*Primary Examiner* — Tu B Hoang
*Assistant Examiner* — Thomas Ward
(74) *Attorney, Agent, or Firm* — Plager Schack LLP

(57) ABSTRACT

A utensil for layering liquids comprising, a stem mechanically coupled to a diffusion ball. The stem further comprises a liquid channel. The utensil is formed such that a user pour layered drinks without the user's hands obstructing the user's view of the diffusion ball.

2 Claims, 3 Drawing Sheets

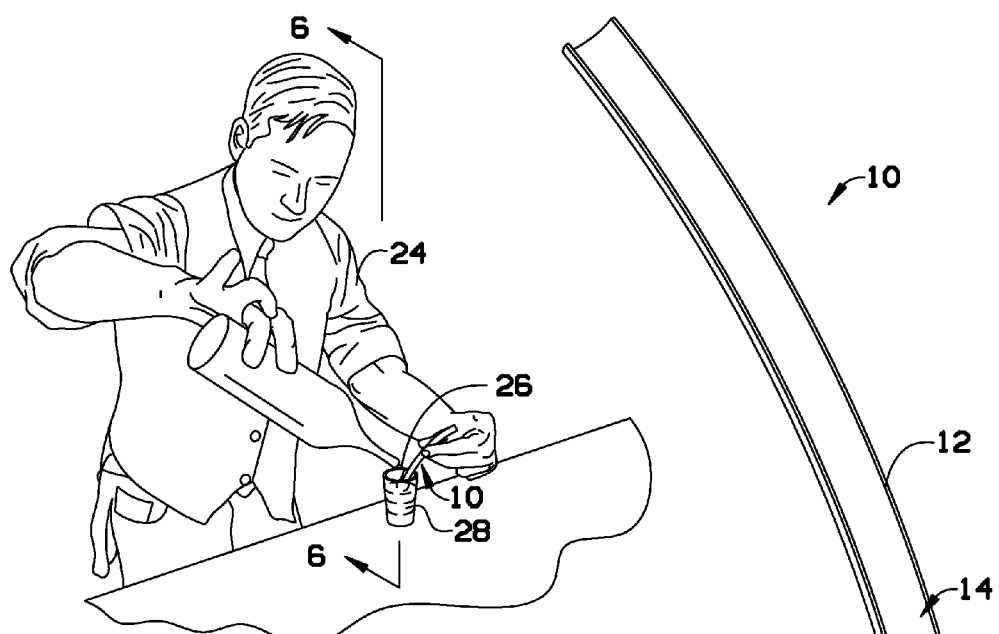
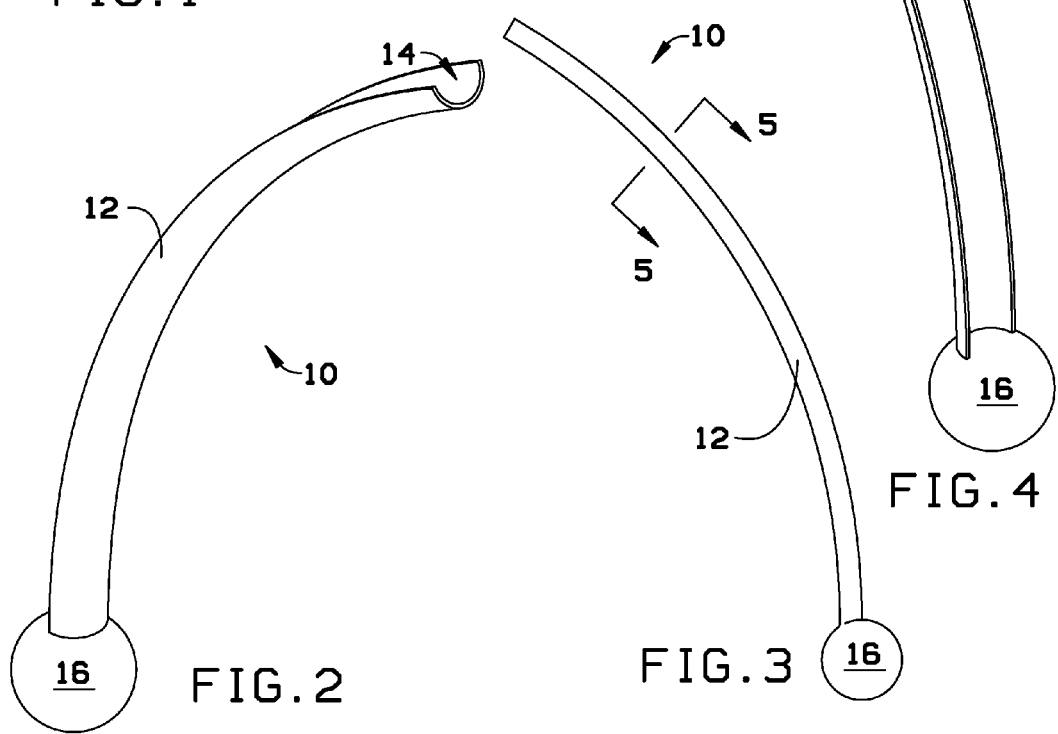

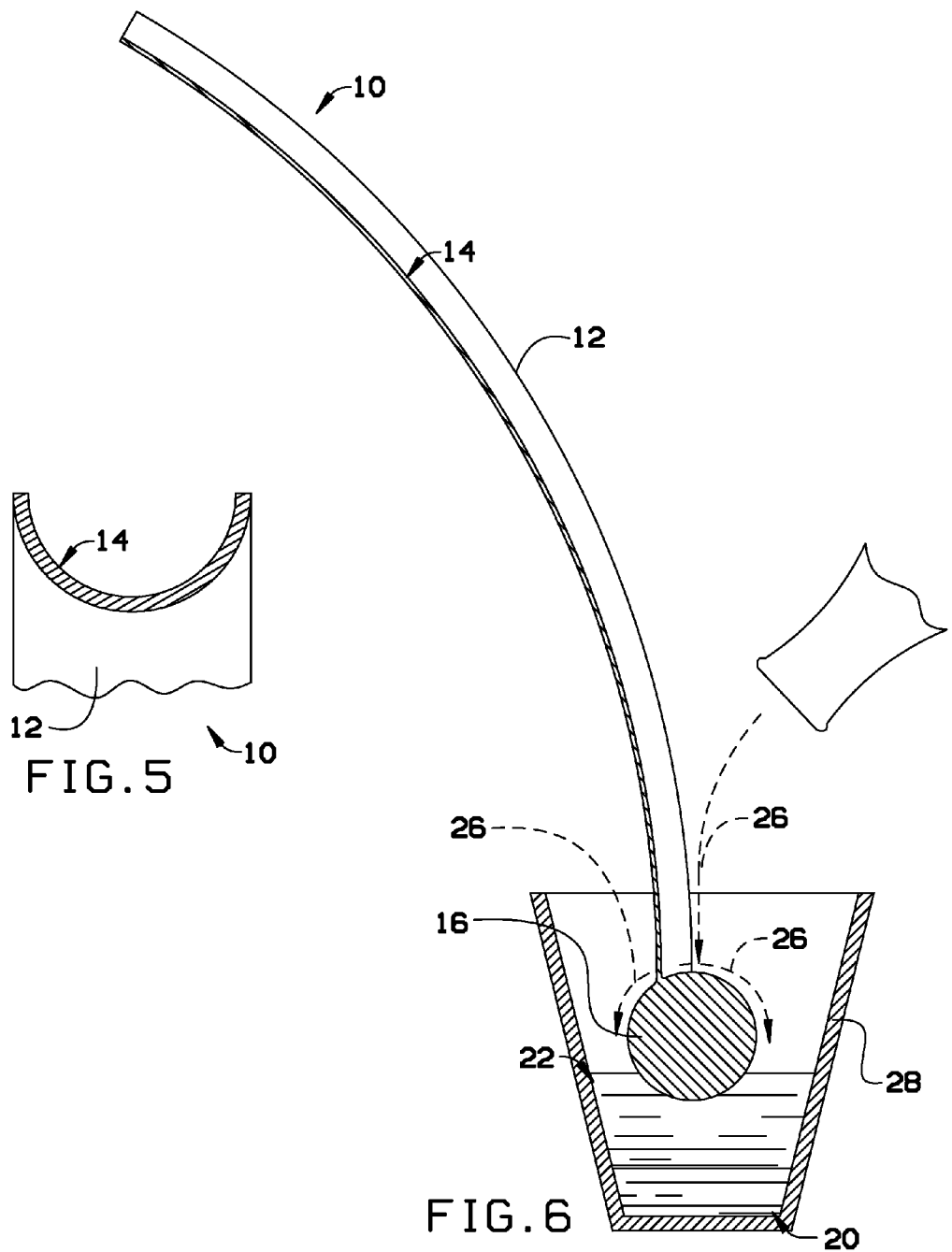

UTENSIL FOR LAYERING LIQUIDS

CROSS REFERENCE TO RELATED APPLICATIONS

This application claims priority to U.S. Provisional Patent Application No. 61/508,220 filed on Jul. 2, 2011.

FIELD OF THE INVENTION

This invention relates devices used to mix alcoholic and non-alcoholic drinks.

BACKGROUND OF THE INVENTION

Present technology for layering a drink involves using a funnel. This is slow, inaccurate and cumbersome because a bartender cannot see the fluid in the glass in which the bartender is pouring. The present invention solves this problem.

BRIEF SUMMARY OF THE INVENTION

A utensil for layering liquids comprising, a stem mechanically coupled to a diffusion ball. The stem further comprises a liquid channel. The utensil is formed such that a user pour layered drinks without the user's hands obstructing the user's view of the diffusion ball.

BRIEF DESCRIPTION OF THE SEVERAL VIEWS OF THE DRAWINGS

Figure 7:
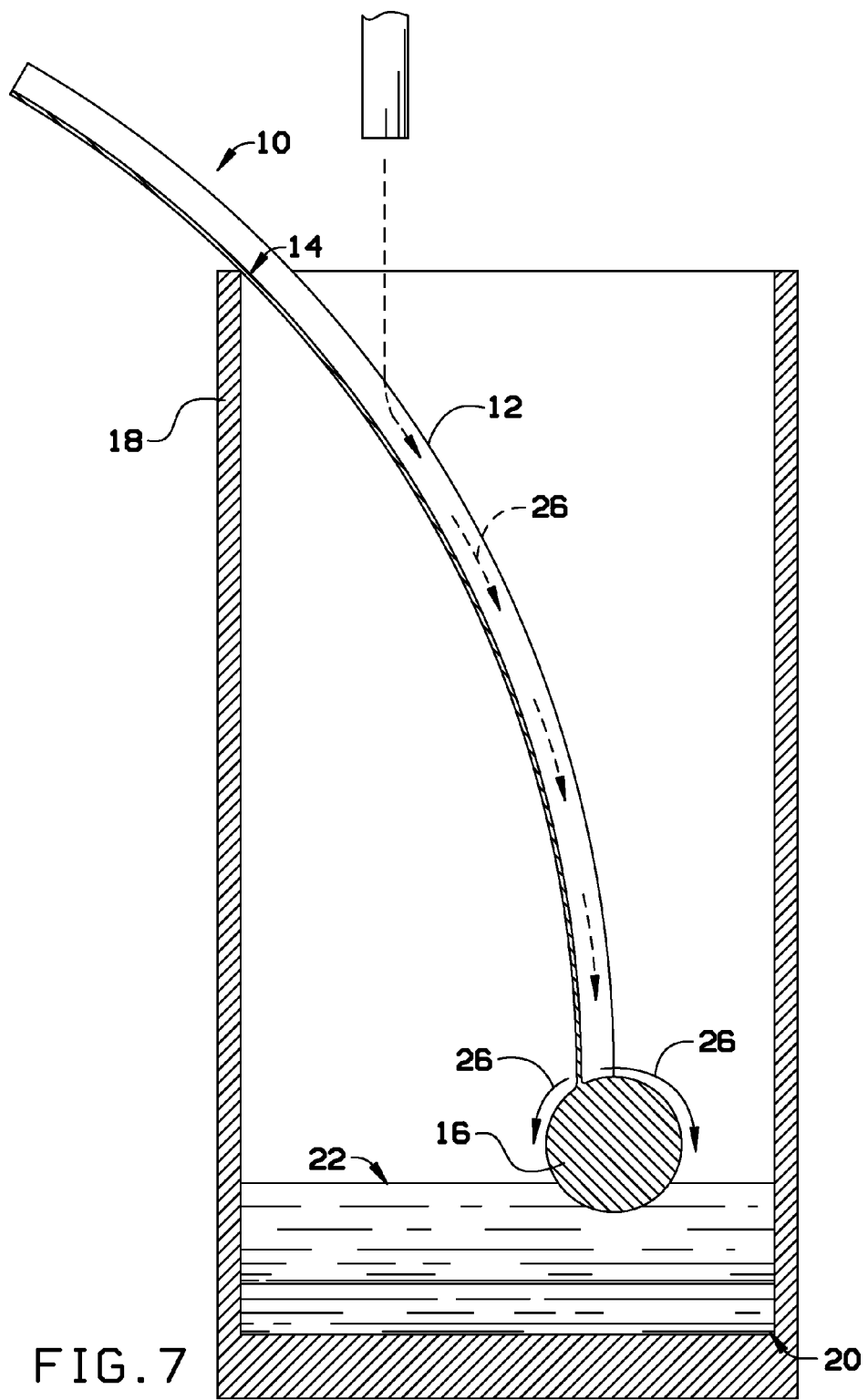

Having thus described the invention in general terms, reference will now be made to the accompanying drawings, which are not necessarily drawn to scale, and wherein:

FIG. 1 is a perspective view of the invention shown in use with a shot glass.

FIG. 2 is a forward perspective view of the invention.

FIG. 3 is a side view of the invention.

FIG. 4 is a rear perspective view of the invention.

FIG. 5 is a section detail view of the invention along line 5-5 in FIG. 3.

FIG. 6 is a section detail view of the invention along line 6-6 in FIG. 1.

FIG. 7 is a section detail view of the invention shown in use with a beer glass.

DETAILED DESCRIPTION OF THE INVENTION

Embodiments of the present invention overcome many of the obstacles associated with layering mixed drinks, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 shows the invention in use. Bartender 24 wants to mix liquid 26 into shot glass 28 without having one's hands obstruct the view of shot glass 28. Bartender 24 accomplishes this with utensil 10.

FIG. 2, FIG. 3, FIG. 4 and FIG. 5 show utensil 10 in more detail. Utensil 10 comprises stem 12 mechanically coupled to a diffusion ball 16. Since utensil 10 is designed to work with items for human consumption all component parts should be made of food grade stainless steel using known metalworking techniques.

Stem 12 further comprises a concave side and a convex side. The concave side is liquid channel 14 and can be used to channel liquid 26 as shown in FIG. 6 and FIG. 7. The stem must also be curved such that the hands of user 24 do not obstruct the view of diffusion ball 16 when in use. In some embodiments, diffusion ball 16 has a ¾" diameter.

FIG. 6 shows utensil 10 in use with shot glass 28. A user pours liquid 26 onto liquid channel 14. Liquid 26 then rolls off diffusion ball 16 to make first layer 20. Subsequently a user can pour a second liquid 26 onto liquid channel 14. Second liquid 26 then rolls off diffusion ball 16 to make second layer 22. In this manner, user 24 can layer a mixed drink in shot glass 28 without the user's hands obstruction the view of shot glass 28.

FIG. 7 shows utensil 10 in use with beer glass 18. A user pours liquid 26 onto liquid channel 14. Liquid 26 then rolls off diffusion ball 16 to make first layer 20. Subsequently a user can pour a second liquid 26 onto liquid channel 14. Second liquid 26 then rolls off diffusion ball 16 to make second layer 22. In this manner, user 24 can layer a mixed drink in beer glass 18 without the user's hands obstruction the view of beer glass 18.

That which is claimed:

1. A liquid dispersion device for facilitating the pouring of a first liquid into a vessel containing a second liquid, the device configured to maintain the first and second layers in a substantially discrete fashion, the device comprising:

a diffusion ball comprising a surface configured to disperse radially outwardly the first liquid when poured onto the diffusion ball so as to reduce the overall force of the first liquid upon the exposed surface of the second liquid; and an arcuate handle comprising consisting essentially of a concave pathway for directing the first liquid into the vessel and into contact with the diffusion ball, attached to the diffusion ball and continuously arcing away from the diffusion ball; wherein the handle further controls the dispersion of the first liquid upon the surface of the second liquid when in use.

2. The liquid dispersion device of claim 1, wherein the diffusion ball comprises a generally spherical surface.

* * * * *